United States Patent [19]
Lewis et al.

[11] 3,978,483
[45] Aug. 31, 1976

[54] STABLE BASE BAND ADAPTIVE LOOP

[75] Inventors: Bernard L. Lewis, Oxon Hill; James P. Hansen, Waldorf, both of Md.

[73] Assignee: The United States of America as represented by the Secretary of the Navy, Washington, D.C.

[22] Filed: Dec. 26, 1974

[21] Appl. No.: 536,698

[52] U.S. Cl............................. 343/100 LE; 325/371
[51] Int. Cl.²......................................... G01S 3/06
[58] Field of Search............. 343/100 LE; 325/371, 325/65

[56] References Cited
UNITED STATES PATENTS

| | | | |
|---|---|---|---|
| 3,177,489 | 4/1965 | Saltzberg | 343/100 LE |
| 3,202,990 | 8/1965 | Howells | 343/100 LE |
| 3,881,177 | 4/1975 | Len et al. | 343/100 LE |

Primary Examiner—Maynard R. Wilbur
Assistant Examiner—Richard E. Berger
Attorney, Agent, or Firm—R. S. Sciascia; Philip Schneider; George Montanye

[57] ABSTRACT

An improved system and technique for reducing interference in signal receiving systems, particularly in sidelobe canceller systems. Adaptive canceller loops receive inputs from an auxiliary channel signal and operate on a main channel signal to reduce interference in the main channel signal. The auxiliary channel signal is supplied through a quadrature hybrid circuit to provide I and Q components to the adaptive loops, which loops are connected in series and cascaded such as to form a plurality of serially connected I and Q loops.

6 Claims, 2 Drawing Figures

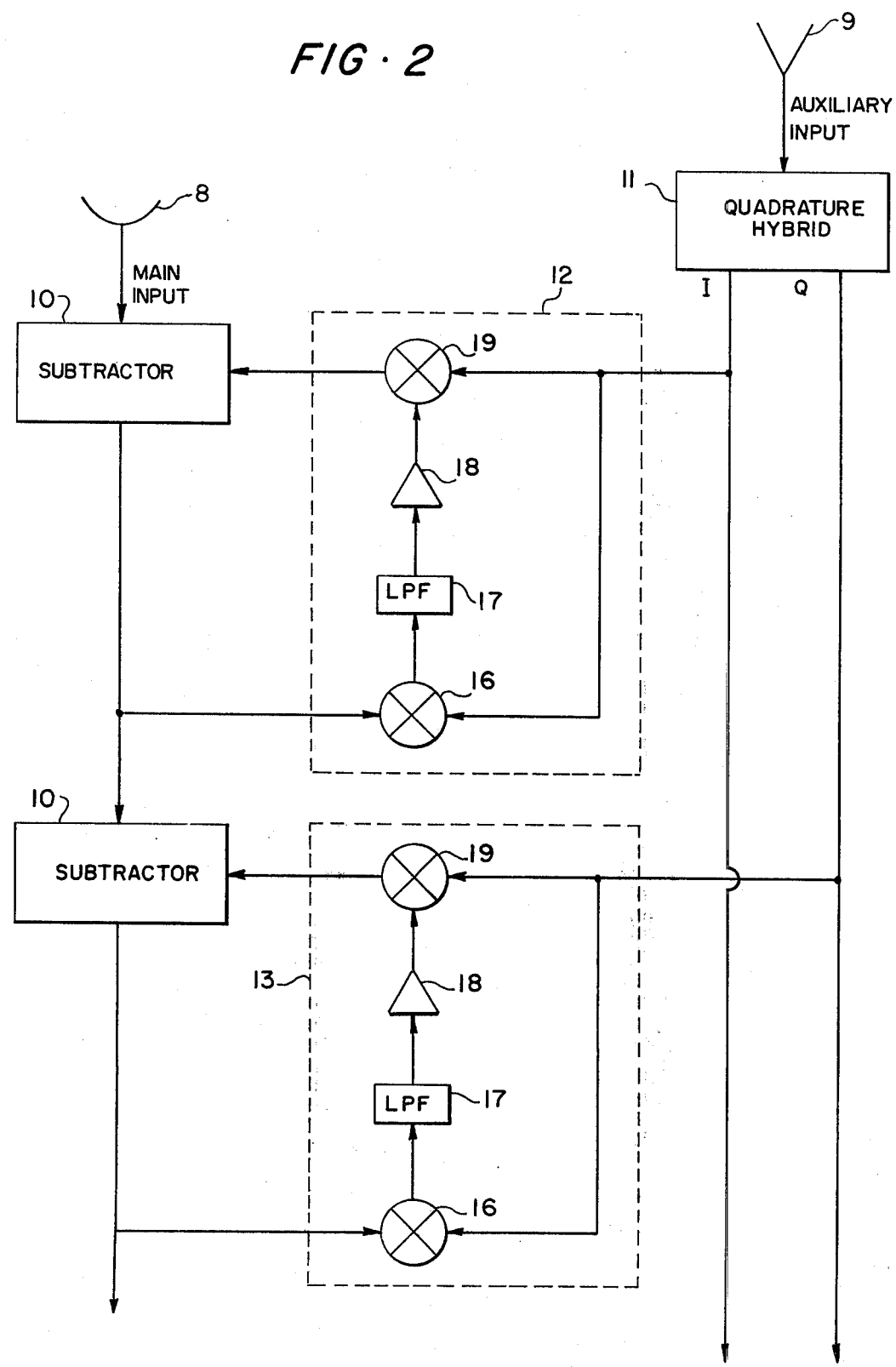

STABLE BASE BAND ADAPTIVE LOOP

BACKGROUND OF THE INVENTION

The present invention relates to interference suppression systems and more particularly to techniques for improving cancellation in a side-lobe canceller system.

Generally, in signal receiving systems such as radar systems, signals received in the side-lobes of the radar antenna interfere with the isolation of desired signals received in the main lobe of the antenna. Although attempts have been made to eliminate the side-lobe interference by employing various side-lobe canceller systems, the same have only met with limited success in different situations.

One such system, as exampled by U.S. Pat. No. 3,202,990, employs a plurality of adaptive canceller loops to operate on offset auxiliary signals to subtract interference received by the main radar antenna. While such conventional systems have been relatively successful in achieving good cancellation, it has been found that the use of the parallel loops leads to a configuration that tends to be unstable due to loop interaction when high gain is used and thereby limits the maximum cancellation achievable.

In other prior known techiques, baseband adaptive loops use quadrature hybrid circuits to separate the auxiliary signal into I and Q components. I and Q in this case refer to the interfering signal phase shifted by zero and ninety degrees respectively, independent of frequency. Each of the components is coupled to form its own adaptive loop coupled in parallel with the other, and coupled to subtract the auxiliary signal from the signal received in the primary antenna to thereby reduce interference. The two loops in parallel make the circuit tolerant of phase and amplitude errors from the quadrature hybrid, but introduce the possibility of instability due to loop to loop oscillation at high gain. As before, such a limitation on gain limits the degree to which interference can be removed from the primary radar signal.

Accordingly, the present invention has been developed to overcome the shortcomings of the above known and similar techniques and to provide an interference cancelling system with improved cancellation performance.

SUMMARY OF THE INVENTION

It is an object of the present invention to provide a signal cancelling system which is easy to implement yet highly reliable in operation.

Another object of the invention is to provide a signal cancelling system that can be constructed using conventional hybrid integrated circuits.

It is a further object of the invention to provide an interference cancelling system that can use higher gain to improve cancellation while reducing instabilities.

A still further object of the invention is to provide a side-lobe canceller system that can use plural loops for higher gain yet average out circuit imbalances.

In order to accomplish these and other objects, the present invention utilizes a main channel sensor for receiving desired and interference signals as the main channel signal, and an auxiliary channel sensor for receiving primarily auxiliary interference signals. The auxiliary channel signal is coupled to a quadrature hybrid circuit to separate the signal into I and Q components. Each of the components is then coupled to its own adaptive loop to form a D.C. weighting function for operating on its own component before subtraction from the main channel signal. Contrary to prior techniques, the I and Q adaptive loops of the present invention are serially connected such that the residue output of the I loop forms the main channel input to the Q loop. The I and Q components are then coupled to form a plurality of cascaded I and Q adaptive loops alternately connected in a serial manner such that the output of each I loop forms the main channel input to the next Q loop, and the output of each Q loop forms the main channel input to the next I loop. Since each I and Q loop is serially connected and independent of the other loops, the gain of each loop can be made very large without encountering loop instabilities so common in the parallel configuration. In addition, since the loops are cascaded, the effective gain is the cascaded gain of all I and Q loops. Further, since each loop is independent of all others, circuit adjustments, such as zeroing of D.C. amplifiers, are more easily made, and circuit imbalances are averaged out over the cascaded series.

Other objects, advantages, and novel features of the invention will become apparent from the following detailed description of the invention when considered with the accompanying drawings wherein:

BRIEF DESCRIPTION OF THE DRAWINGS

FIG. 2 is a schematic diagram showing the construction of the adaptive loops used in FIG. 1.

DETAILED DESCRIPTION OF THE PREFERRED EMBODIMENT

Figure 1:
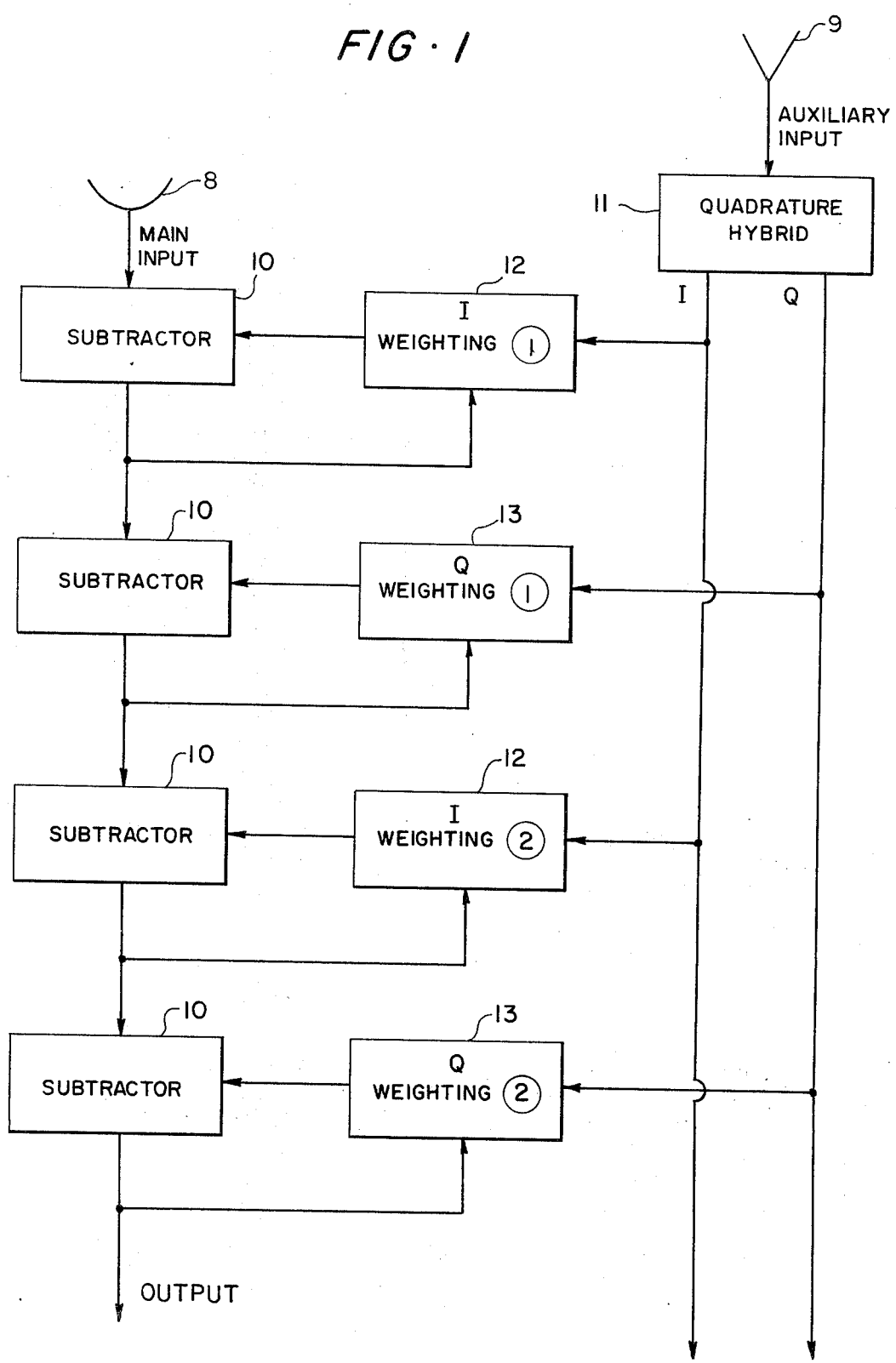
FIG. 1 is a schematic diagram showing a preferred embodiment of the cascaded I and Q loops forming the cancelling system according to the present invention.

Referring now to FIG. 1 a schematic diagram shows a preferred embodiment of the cascaded I and Q (in-phase and quadrature) adaptive loops forming the canceller system according to the present invention. In the present example, the invention will be described with reference to a radar system although the inventive teachings are equally applicable to other types of signal processing systems. Generally, the system includes a main receiving channel sensor in the form of a directional radar antenna 8 and an independent auxiliary receiving channel sensor in the form of omnidirectional antenna 9 positioned in space relative to the main receiving antenna 8. While the system being described only refers to the main antenna as a receiving antenna, the antenna could just as well be modified in a conventional manner to both transmit and receive. The main radar antenna 8 forms the main channel input for receiving radar signals and any interference that may be present from the side-lobes, while the auxiliary antenna 9 receives primarily interference and forms the independent receiving channel input that provides samples of the interference environment in which the radar is attempting to operate. For simplicity, the radar and auxiliary receivers as well as passband filters have been omitted in the drawing since they are unnecessary to the understanding of the inventive principle, it being obvious that such receivers and filters are incorporated to receive and process the antenna signals in a manner well known in the art.

The signals at antenna 8, after passing through the radar receiver and filters (not shown), are coupled as input to the subtractor 10. The output of the subtractor 10 is in turn coupled to the input of a succeeding subtractor also labeled 10, and on through a plurality of subtractors 10 of identical construction connected in series from one subtractor output to the input of the next subtractor. The outputs from the subtractors 10 provide the main channel radar signal whose final output is taken from the last subtractor in the series. In a like manner, the signals received at antenna 9, after passing through an auxiliary receiver and filters (not shown), are coupled to a quadrature hybrid circuit 11. The circuit 11 is of conventional construction and separates the signal received by 9 into in-phase quadrature components I and Q, respectively, in a manner well known in the art.

According to the present invention, the I component is coupled as input to a first weighting circuit 12 which also receives input from the output of the first subtractor 10 and provides an output which is coupled back as a second input to the first subtractor 10, for subtraction from the main channel input signal to 10, to form a first adaptive loop. The adaptive loop acts to develop a weighting function 1 for operation on the I component which may then be subtracted from the main channel signal to form a main channel residue output. In a like manner, the Q component is connected as input to a second weighting circuit 13 which receives input from the output of the second subtractor 10 and provides an output which is coupled back as a second input to the second subtractor, for subtraction from the main channel residue signal from the output of the first subtractor, to form a second adaptive loop. The second adaptive loop acts to develop a Q weighting function 1 for operation on the Q component in the same manner as the I loop such that interference in the main channel signal may be reduced. As shown by FIG. 1, each I and Q component is coupled to further weighting circuits 12 and 13 to form I and Q weighting functions 2 which are alternately coupled in the same serial order to form a series of cascaded adaptive loops. Each loop output from a subtractor 10 forms the input to the subtractor of the next succeeding adaptive loop such that the residue output of each I loop forms the main channel input to the next Q loop, and the residue output of each Q loop forms the main channel input to the next I loop. Although only two loop repetitions of each component have been shown, as many adaptive loops can be serially arranged in the manner shown, using the same I and Q components, as is needed to achieve a desired cancellation.

Turning now to FIG. 2, the construction of the adaptive loops are shown in more detail where like numerals are used to show like elements of FIG. 1. Since the adaptive loops are of identical construction, a description of one will be sufficient for an understanding of all. Generally, the loops are formed as a conventional adaptive loop having the output of subtractor 10 and one of the I or Q components (which are both at the same frequency as the main channel loop input) coupled as input to a first multiplier 16. The output of the multiplier 16 is then coupled through a low pass filter 17 which filters out upper sidebands and passes a D.C. signal that is called the weighting function. The weighting function is then amplified in a high gain D.C. amplifier 18 and coupled as input along with the input from an I or Q component to a multiplier 19. The output of the multiplier 19 is then coupled back to a subtractor 10 to complete the canceller loop where it is subtracted from the main channel signal from 8. As can be seen, each subtractor output is a main channel residue output that is used as the main channel signal for the next succeeding subtractor. The operation of the loop to develop the weighting function is similar to conventional adaptive loops except that the weighting function is D.C. due to the same frequency inputs at 16 forming the baseband system. The loops operate to cause the weighting functions to go towards zero at which point maximum cancellation is being obtained. As can be seen, contrary to some conventional systems which offset the main channel signal at the loop input, the present invention is constructed such that the loop input frequency is the same as the loop output frequency.

The operation of the system will now be described with reference to FIG. 1. When an interference source (in this case jammers or other sources) are present, the signal received by the radar antenna 8 includes a radar signal carrier modulated by the radar signal and an interference carrier having the same frequency, but differnt amplitude and phase, modulated by the jammer waveform. The auxiliary receiving antenna 9 samples the environment in which the radar is attempting to operate and provides primarily interference signals corresponding to those received by the main antenna, except for a phase shift and gain difference due to the difference in path between the jammer and auxiliary antenna and jammer and radar antenna. The auxiliary antenna is positioned relative to the main antenna, as is well known, such that the jammer waveform modulation is substantially correlated at both antennas. After passing through the quadrature hybrid circuit, the first adaptive loop develops an I weighting function 1 which operates on the I component through the adaptive loop to cause the residue output from subtractor 10 to become orthogonal to the I component. The operation of the Q loop is similar to the I loop except for the use of the Q component and the input of the residue from the I loop to the Q loop subtractor. Since the Q component is originally orthogonal to the I component due to the known quadrature hybrid split, the effect of the operation of the Q loop on the I loop residue is to cancel the residue interference signal. Naturally, since the speed of response of each of the loops is proportional to loop gain, and since loop gain is proportional to average input power, the loop cooperation will tend to cancel jamming signals having high average power, while being relatively insensitive to radar returns.

Contrary to prior known techniques employing parallel loop operation, the present serial connection of the I and Q loops results in independent loop operation. The gain of each loop can therefore be made very large to increase cancellation without the danger of incurring loop instability from loop oscillation. In addition, the I and Q components from a quadrature hybrid circuit are not always exactly orthogonal and equal power components, the effect of which is to produce incomplete cancellation. Normally, the parallel connection of I and Q loops exhibits feedback which compensates for phase and amplitude errors produced by the quadrature hybrid split. According to the present invention, this phase and amplitude error is corrected by cascading a plurality of alternately coupled I and Q loops as described. As can be shown by a mathematical analysis of the loop operations, the phase and amplitude error due to the quadrature split is continually reduced in the output residue from each loop due to the cascaded configuration.

As can be seen from the above description, the present invention provides an improved system for reducing interference in a received signal. Using only conventional I and Q components connected to form the cascaded adaptive loop configuration, a highly reliable yet easily implemented canceller system can be constructed. Since the system employs only resistances, capacitances, and active elements, it is amenable to construction with economical hybrid integrated circuit techniques. Further, since the loops are serially connected to operate independently of each other, loop gain can be cascaded to increase interference cancellation. At the same time, circuit adjustments, such as zeroing of the D.C. amplifiers, is made easier from independent loop coupling, and circuit imbalances are averaged out due to the serially cascaded operation of the loops. All of these are new features not found in prior known systems as previously mentioned.

While the invention has been described with reference to a radar system it is clear that the present teachings are applicable to other canceller systems. In addition, while only one auxiliary antenna was shown, it is within the scope of the invention to employ a plurality of auxiliary antennas when multiple interference sources are present. In such a situation, the output of the cascaded series of adaptive loops from one antenna would form the input to the cascaded series of adaptive loops of another antenna.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. An improved signal cancelling system comprising:
   first input means for providing a main channel signal;
   second input means for providing an auxiliary channel signal;
   quadrature hybrid circuit means coupled to said second input means for providing in-phase and quadrature components from said auxiliary channel signal;
   first adaptive loop means coupled to receive said main channel signal and one of said components for causing said main channel signal to become orthogonal to the one of said components and form a main channel residue signal output; and
   second adaptive loop means coupled to receive said main channel residue signal output and the other of said components for cancelling said main channel residue signal output and provide a cancelled main channel signal output.

2. The apparatus of claim 1, further including a plurality of alternately coupled first and second adaptive loop means wherein each of said plurality of adaptive loop means is serially coupled such that the main channel residue signal output from each first adaptive loop means forms a residue signal input to the next succeeding second adaptive loop means and the cancelled main channel signal output from each second adaptive loop means forms the main channel signal input to the next succeeding first adaptive loop means, and further wherein the in-phase and quadrature components are coupled to alternate adaptive loop means in the same serial order as to the first two adaptive loop means of said series.

3. The system of claim 2 wherein each of said adaptive loop means comprises, a subtractor coupled to receive a main channel signal as a first input and provide an output, a first multiplier coupled to multiply said subtractor output and one of said phase components to provide an output, a low pass filter coupled to filter said first multiplier output, a high gain amplifier coupled to amplify said filtered output, a second multiplier coupled to multiply said amplified output and said one of said components and provide an output, and means for coupling said second multiplier output as a second input to said subtractor for subtraction from the first input of said subtractor.

4. The system of claim 3 wherein said first input means includes a main channel sensor means for receiving desired and interference signals as said main channel signal and wherein said second input means includes an auxiliary channel means for receiving primarily interference as said auxiliary channel signal.

5. The system of claim 4 wherein said main channel sensor means is a directional antenna and said auxiliary channel sensor means is an omnidirectional antenna.

6. The system of claim 1 wherein each of said adaptive loop means is constructed to provide said signal output at the same frequency as the signal provided by said first input means.

* * * * *